United States Patent [19]
Onoguchi

[11] Patent Number: 5,748,778
[45] Date of Patent: May 5, 1998

[54] IMAGE PROCESSING APPARATUS AND METHOD

[75] Inventor: Kazunori Onoguchi, Tokyo, Japan

[73] Assignee: Kabushiki Kaisha Toshiba, Kanagawa-ken, Japan

[21] Appl. No.: 523,428

[22] Filed: Sep. 5, 1995

[30] Foreign Application Priority Data

Sep. 8, 1994 [JP] Japan .................. 6-214365

[51] Int. Cl.⁶ .................. G06K 9/00; G06K 9/48
[52] U.S. Cl. .................. 382/199; 382/170
[58] Field of Search .................. 382/199, 170, 382/171, 174, 193, 194, 131, 132; 358/522

[56] References Cited

U.S. PATENT DOCUMENTS

| | | | |
|---|---|---|---|
| 4,896,279 | 1/1990 | Yoshida | 364/559 |
| 4,903,310 | 2/1990 | Takeo et al. | 382/128 |
| 4,974,077 | 11/1990 | Kusaka | 382/141 |
| 5,081,689 | 1/1992 | Meyer et al. | 382/199 |
| 5,150,433 | 9/1992 | Daly | 382/250 |
| 5,321,770 | 6/1994 | Huttenlocher et al. | 382/199 |
| 5,436,978 | 7/1995 | Kasdan | 382/133 |

OTHER PUBLICATIONS

M. Kas et al., "Snakes: Active Contour Models", IEEE, pp. 259–268 (1987).

Primary Examiner—Yon Couso
Assistant Examiner—Ha Tran Nguyen
Attorney, Agent, or Firm—Finnegan, Henderson, Farabow, Garrett & Dunner, L.L.P.

[57] ABSTRACT

An image processing apparatus of the present invention extracts a boundary point between a white pixel area and a black pixel area on a binary image. In the image processing apparatus, a scan line set section sets a scan line on the binary image. A cumulative histogram creation section examines each pixel on the scan line and creates a cumulative histogram, a predetemined value being added whenever one of a black pixel and a white pixel is extracted, corresponding to pixel position of the scan line. A boundary point extraction section extracts a point from the binary image corresponding to a point on the histogram where the display moves from a relatively flat part to a monotone increasing part and determines the pixel position corresponding to the extracted point on the scan line as a boundary point which indicates a transition from one pixel area to the other pixel area.

12 Claims, 8 Drawing Sheets

IMAGE PROCESSING APPARATUS AND METHOD

BACKGROUND OF THE INVENTION

1. Field of the Invention

The present invention relates to an image processing apparatus and method for extracting boundary points between white pixel area and black pixel area on binary image.

2. Description of the Related Art

In the prior art, as a method for extracting boundary points between black pixel area and white pixel area on binary image, the method for extracting part whose intensity value changes from white to black, or from black to white on the binary image has been used. In this method, spacial filtering, i.e. edge-extraction operator, is applied. For example, the edge-extraction operator is local mask of "3×3", which includes nine calculation coefficients. The local mask is shifted by unit of one pixel toward scan direction on binary image, and calculation value between nine pixel values of "3×3" and corresponding calculation coefficients of the local mask is determined. The calculation value is change degree of intensity between one center pixel value and eight neighboring pixel values of the nine pixels "3×3". If the calculation value is large, the one center value changes largely in comparison with eight neighboring pixel values. Therefore, the above calculation processing for all pixels on binary image is executed, and the pixels each of which calculation value is large is extracted as boundary points of the binary image.

However, the space filtering method is weak in noise because pixels of noise is incorrectly extracted as the boundary point. In short, it is difficult to extract the boundary point between black pixel area and white pixel area correctly. For example, on scan line "L" shown in FIG. 3, a point "A" is correct boundary point between black pixel area and white pixel area. By using the local mask as mentioned-above, points "B,C,D,E" are extracted incorrectly as the boundary points. Especially, in case that the black pixel area is not complete continuous area (includes many cut noises) as shown in FIG. 5, the boundary points (points on curve 11, 12) between black pixel area and white pixel area is not extracted correctly.

Then, as another method for extracting boundary points, snakes method for fitting curve on pixel position whose energy of binary image is small has been used. In the snakes method, one curve is initially set on binary image and function value between position of the curve and pixel value of the position on the binary image is calculated by using energy function equation. Then, whenever the curve is moved by unit of one pixel on the binary image, the function value corresponding to the position of the curve is calculated in order. It is well known that the function value is small when the curve is positioned on boundary line of the binary image. Therefore, the boundary points are extracted according to the position of the curve which function value of pixels corresponding to the position of the curve is minimized.

However, it is difficult to control parameter (coefficients) of the energy function equation. Furthermore, it often happens that the curve is fitted on noise and the curve can not move to the boundary line on the binary image as shown in FIG. 4. In short, when the curve is positioned on noise, it sometimes happens that the function value is minimized at position of the noise. Therefore, the position of the noise is incorrectly extracted as the boundary points.

SUMMARY OF THE INVENTION

It is an object of the present invention to provide image processing apparatus and method for extracting the boundary points correctly on the binary image without the influence of the noise.

According to the present invention, there is provided image processing apparatus, comprising; scan line set means for setting a scan line on binary image; cumulative histogram creation means for examining each pixel on the scan line of the binary image and for creating a cumulative histogram, which predetermined value is added whenever black pixel is extracted, corresponding to pixel position of the scan line; and boundary point extraction means for extracting a point which moves from flat part to monotone increasing part on figure of the cumulative histogram and for deciding pixel position corresponding to the point on the scan line as a boundary point which moves from white pixel area to black pixel area.

Further in accordance with the present invention, there is provided image processing apparatus, comprising; scan line set means for setting a scan line on binary image; cumulative histogram creation means for examining each pixel on the scan line of the binary image and for creating a cumulative histogram, which predetermined value is added whenever white pixel is extracted, corresponding to pixel position of the scan line; and boundary point extraction means for extracting a point which moves from flat part to monotone increasing part on figure of the cumlative histogram and for deciding pixel position corresponding to the point on the scan line as a boundary point which moves from black pixel area to white pixel area.

DESCRIPTION OF THE PREFERRED EMBODIMENTS

Figure 5:
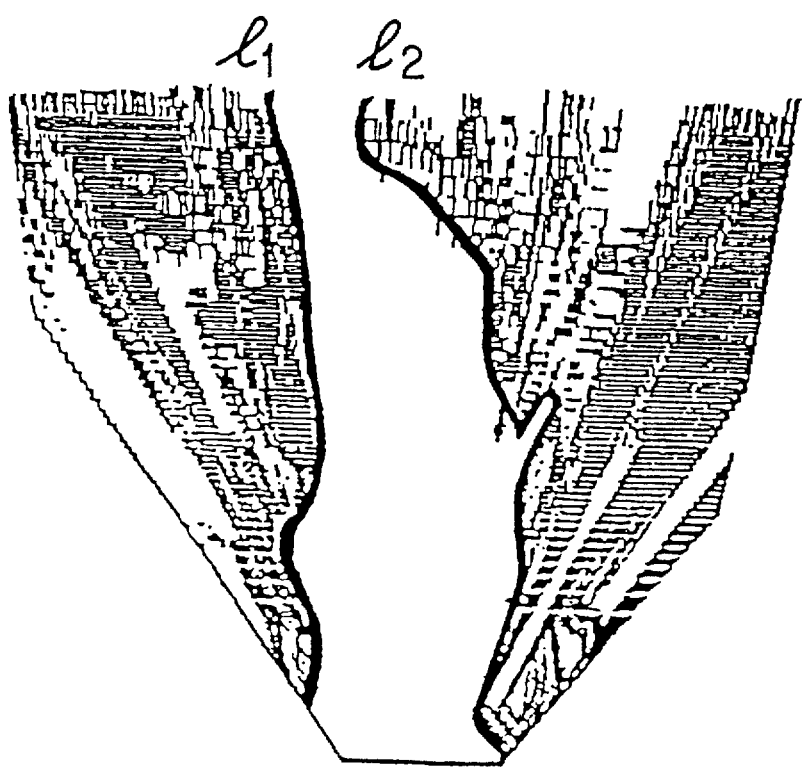
FIG. 5 is a schematic diagram of the boundary line between black pixel area and white pixel area on the binary image.

One embodiment of the present invention will be explained. In the embodiment, as shown in FIG. 5, it is assumed that the boundary points are extracted between the black pixel area including many cut noises and the white pixel area.

Figure 1:
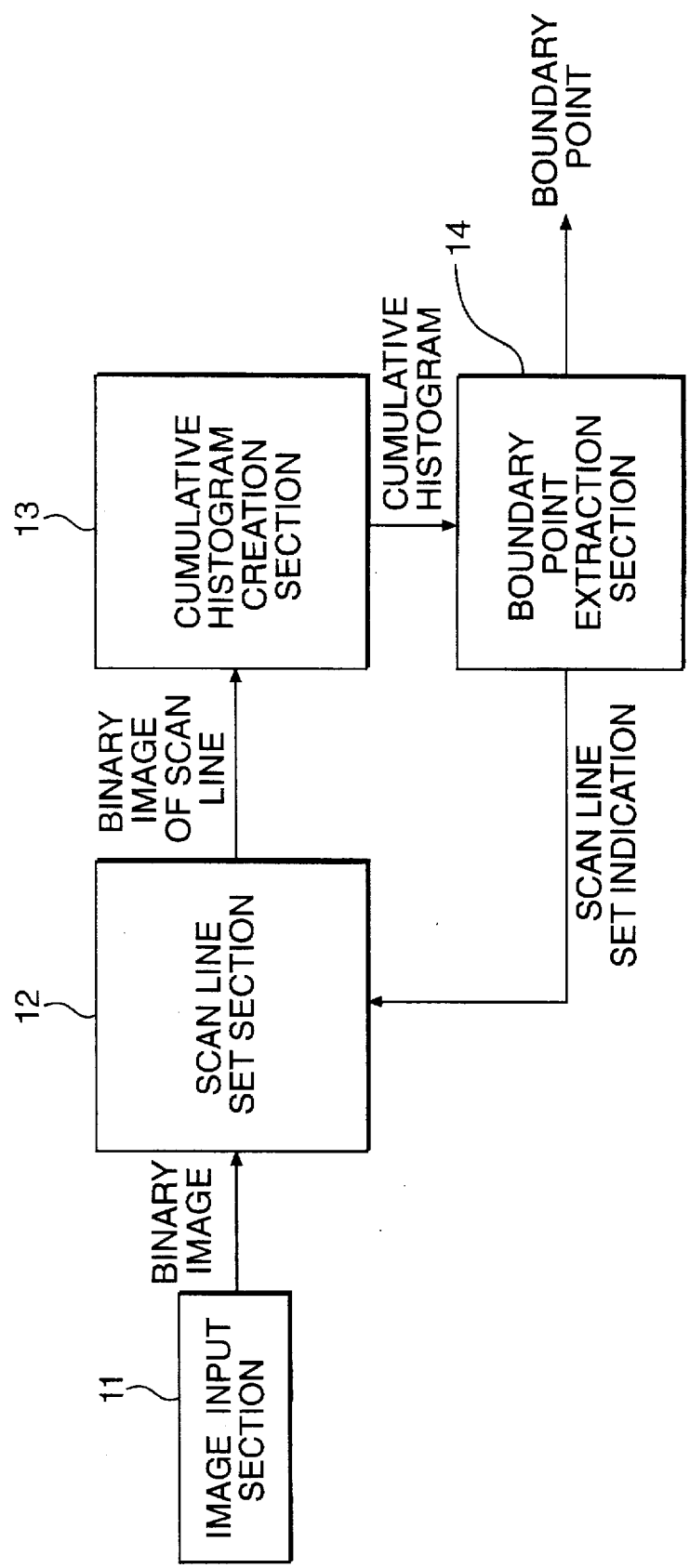
FIG. 1 is a block diagram of the image processing apparatus according to an embodiment of the present invention.

First, FIG. 1 is a block diagram of the image processing apparatus according to the embodiment of the present invention. In FIG. 1, binary image data is supplied to a scan line set section 12 through an image input section 11. The scan line set section 12 sets start point in white pixel area of the binary image and end point at edge of the binary image. A line between the start point and the end point is the scan line. Then, the scan line set section 12 extracts area including the scan line from the binary image and the area is supplied to a cumulative histogram creation section 13. The cumulative histogram creation section 13 examines from the start point to the end point of the scan line in order. In short, the cumulative histogram creation section 13 decides whether the pixel is black or white on the scan line in order, and calculates cumulative value which "1" is added whenever the pixel is decided to be black. In the cumulative histogram, a horizontal axis represents each pixel position of the scan line and a vertical axis represents the cumulative value corresponding to the pixel position of the horizontal axis. In short, the cumulative value is plotted on the vertical axis corresponding to the pixel position of the horizontal axis. In these ways, the cumulative histogram is created for all black pixel of the scan line and the cumulative histogram is supplied to a boundary point extraction section 14. The boundary point extraction section 14 examines from the start point to the end point of figure of the cumulative histogram and extracts the point which from flat part to monotone increasing part according to the predetermined condition. Then, pixel position corresponding to the extracted point on the horizontal axis is outputted as a boundary point of the binary image. Next, the boundary point extraction section 14 sends a scan line set indication to the scan line set section 12. The scan line set section 12 sets second scan line on the binary image. As for the second scan line, the boundary point is extracted in the same way. (In this case, the scan line set indication is sent to the scan line set section 12. However, the scan line set section 12 may set plural scan lines on the binary image from the beginning, and the boundary point may be extracted by unit of one scan line.) In this way, the boundary point extraction section 14 extracts a boundary line by connecting the boundary points extracted from each scan line.

Figure 2:
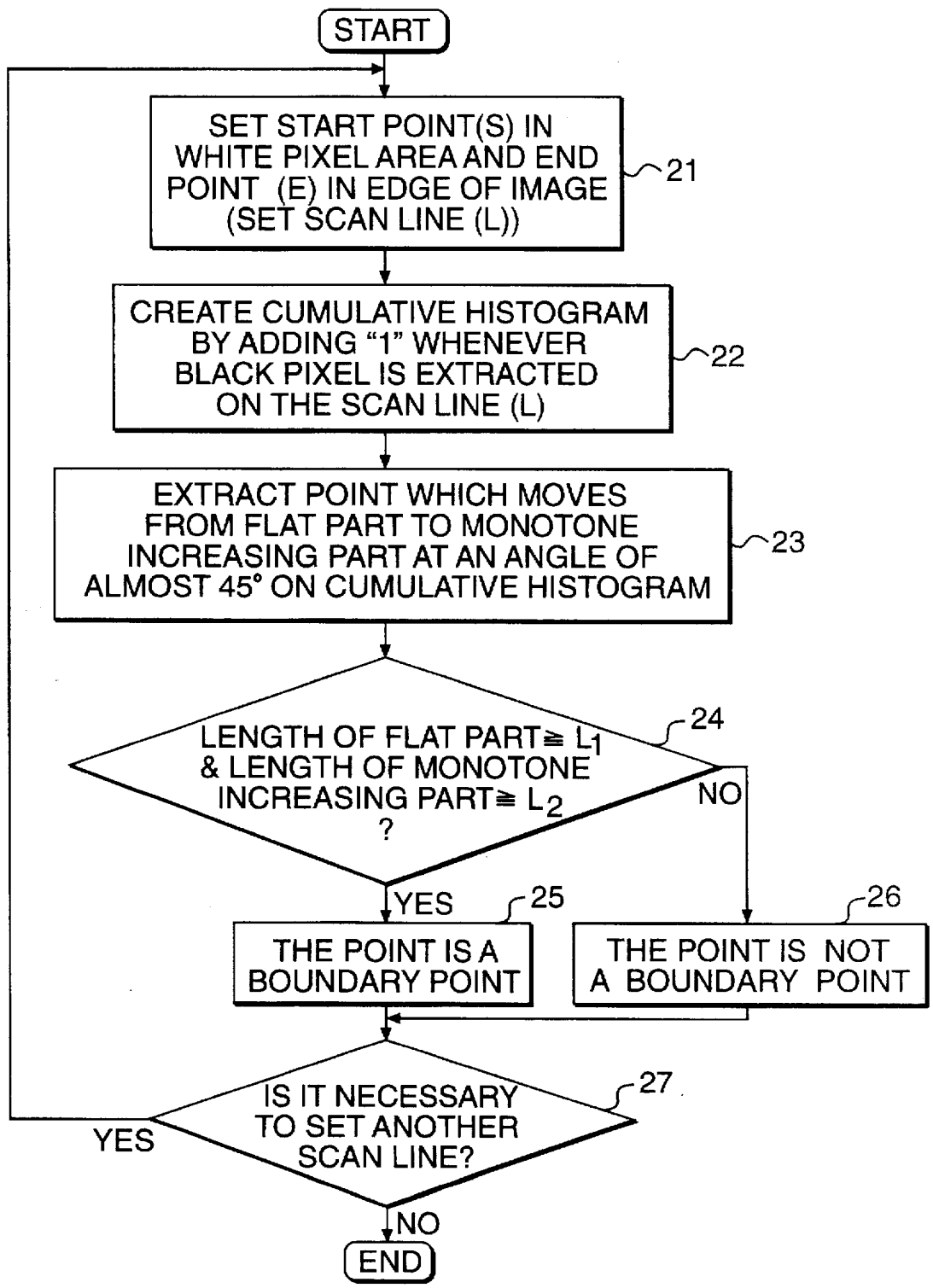
FIG. 2 is a flowchart of processing of the image processing apparatus according to the embodiment of the present invention.
Figure 3:
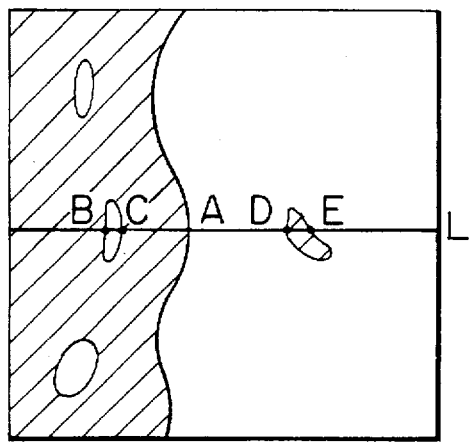
FIG. 3 is a schematic diagram of the boundary point on scan line of the binary image.
Figure 4:
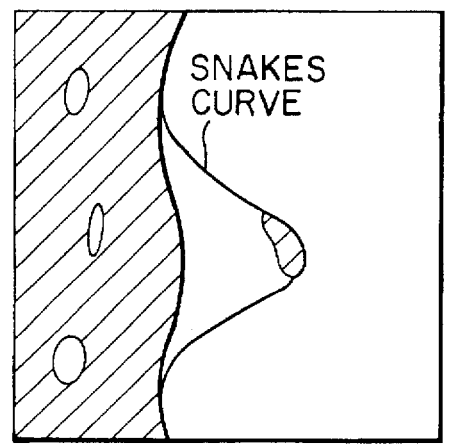
FIG. 4 is a schematic diagram of the curve of snakes on the binary image.
Figure 6A:
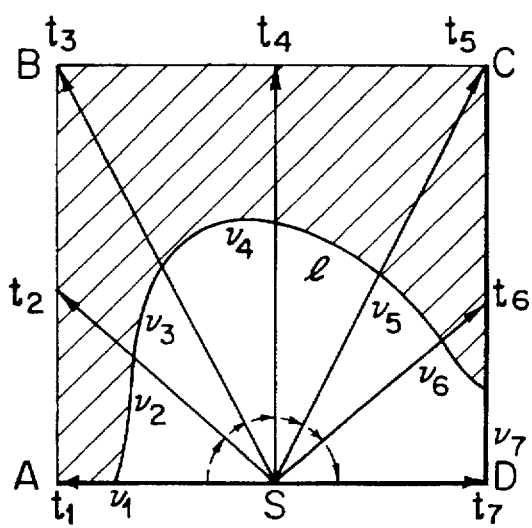
FIG. 6A, FIG. 6B, and FIG. 6C are schematic diagrams of plural scan lines set on the binary image respectively according to the embodiment of the present invention.
Figure 6B:
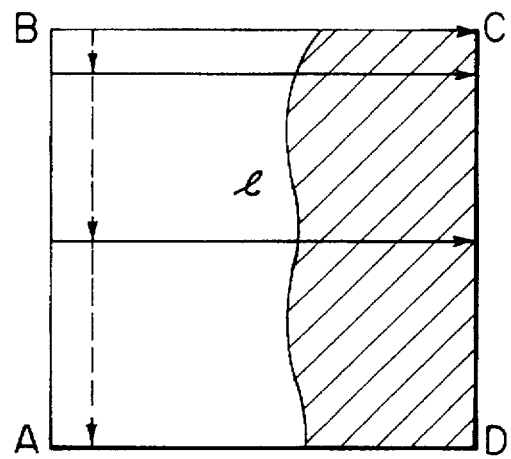
Figure 6C:
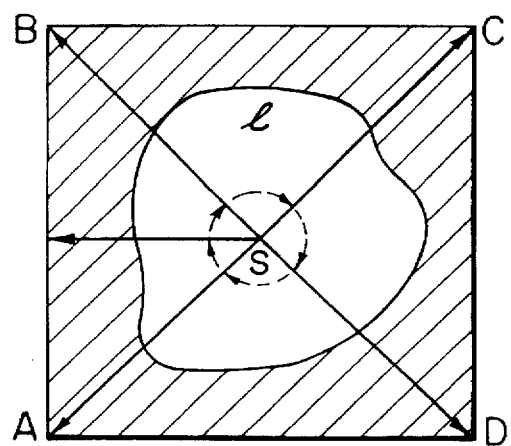

FIG. 2 is a flow chart of processing of the image processing apparatus according to the embodiment of the present invention. By referring to FIG. 2, the processing of the embodiment will be explained in detail. First, a scan line is set on the binary image (step 21). In this case, user previously selects the kind of the scan line, i.e. the start point and the scan direction. For example, in the binary image shown in FIG. 6A, a straight line between the center point "S" of lower side of the image and the end point "A,B,C,D" of the image. The center point "S" is the start point and the scan direction is shown as arrow in FIG. 6A. The end point is set in order as "A→B→C→D" and seven boundary points v1~v7 are extracted from seven scan lines t1~t7 respectively. A boundary line "1" is extracted by connecting seven boundary points. In FIG. 6B, a horizontal line between a point of left side and a point of right side on the binary image is set as the scan line. In this case, the point of left side is the start point and the scan direction is shown as an arrow in FIG. 6B. The plural scan lines from "BC" to "AD" are set in order and each boundary point is extracted from the plural scan lines respectively. A boundary line "1" is extracted by connecting the boundary points. In FIG. 6C, a straight line between center point "S" and end point "A,B,C,D" is set as the scan line. In this case, the center point "S" is the start point and the scan direction is shown as an arrow in FIG. 6C. The end point is set clockwise as "A→B→C→D→A" and each scan line is set respectively. Then, a boundary point is extracted from the plural scan lines respectively. A boundary line "1" is extracted by connecting the boundary points.

Figure 7:
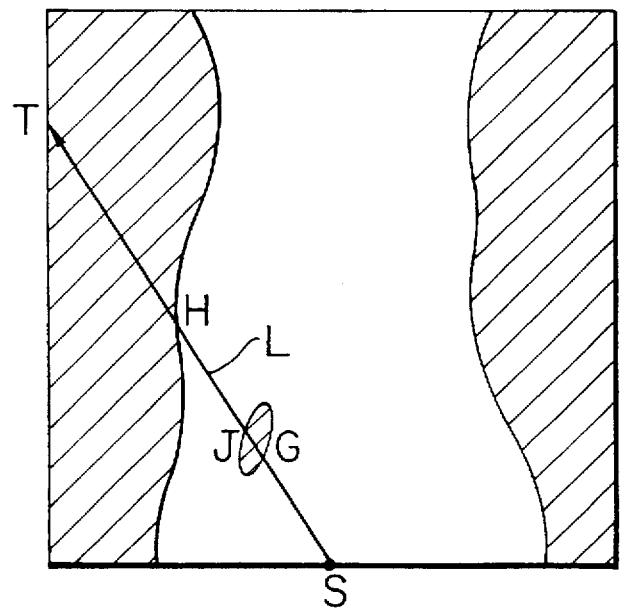
FIG. 7 is a schematic diagram of the boundary point on the scan line according to the embodiment of the present invention.

As for the scan line "L", the boundary point "H" is extracted by following processing (1) (2). FIG. 7 is a schematic diagram of the boundary point "H" on the scan line "L" of the binary image.

(1) The 1st-dimension array LINE[i] (0<i<1L1) for storing the cumulative histogram is prepared. After setting each element value of the array LINE [i] by "0", the pixels of the line "L" are scaned from the start point "S" to the end point "T". (The number of pixels on the scan line "L" is 1L1) In this case, if i-th pixel from the start point "S" on the scan line "L" is black pixel, following equation is represented.

LINE [i]=LINE[i–1]+1

In short, the 1 st-dimension array LINE[i] is cumulative value of black pixels corresponding to the pixel position of the scan line "L".

(2) After scanning the line "L" till the end point "T", distribution of the cumulative histograms is examined. First, a graph of the cumulative histogram is created (step 22). In the graph, the horizontal axis is pixel position i (0<i<1L1) and the vertical axis is LINE[i]. In short, element i of the horizontal axis is pixel position i of the scan line and LINE [i] of the vertical axis is the cumulative value of the black pixel corresponding to each pixel position of the horizontal axis.

Figure 8:
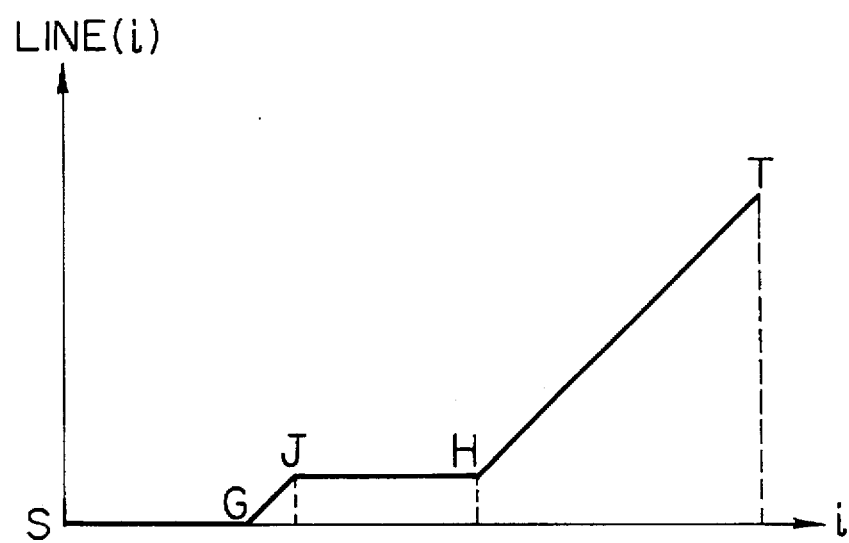
FIG. 8 is a schematic diagram of a cumulative histogram corresponding to the scan line of FIG. 7 according to the embodiment of the present invention.

Concretely, as for the scan line "L" shown in FIG. 7, the graph of the cumulative histogram shown in FIG. 8 is created. In case of the boundary point which moves from white pixel area to black pixel area under the general situation of the binary image, it is a turning point which moves from flat part to monotone increasing part on figure of the graph. In FIG. 8, the point "H" is the boundary point correctly. As for the figure of the graph, the flat part "JH" continues before the point "H" and the monotone increasing part "HT" continues at an angle of almost 45° with direction of the flat part "JH" after the point "H". In this case, as for the point "G", the flat part "SG" continues and the monotone increasing part "GJ" continues at an angle of almost 45° with direction of the flat part "SG". However, the length of the monotone increasing part "GJ" is short because the point "G" is not the boundary point correctly. Therefore, by examining the figure of the graph, if the flat part continues long before the point i and the monotone increasing part continues long at an angle of almost 45° with direction of the flat part after the point i, the point i is the boundary point between white pixel area and black pixel area correctly.

In short, if the length of the flat part is above first threshold L1 and the length of the monotone increasing part is above threshold L2, the point i is decided to be the boundary point (step 23,24,25). If the above condition is not satisfied, the point i is decided to not be the boundary point (step 26). In FIG. 8, in case of the point "H", the above condition is satisfied. Therefore, the point "H" is decided to be the boundary point.

The threshold "L1", "L2" is different according to degree of mass of black pixel area and quantity of noise in white pixel area. If the degree of mass of black pixel area is low (small black pixel area is dotted), the threshold L2 of the monotone increasing part is set as large value. If many noises are included in white pixel area, the threshold L1 of the flat part is set as small value.

If the degree of mass of black pixel area is high (black pixel area continues large), the angle of the monotone increasing part with direction of the flat part is 45° correctly. However, if the degree of mass of black pixel area is low (small black pixel area is dotted), the angle is smaller than 45°. If many small black pixel areas are included in large white pixel area as noise, the flat part located before the boundary point is not figure of complete flat but figure of some increasing. Therefore, the threshold T1 of the flat part and the threshold T2 of the monotone increasing part are previously set as follows. On figure of graph of the cumulative histogram, the point, which angle Q1 between the flat part and the horizontal axis is (O<Q1<T1) and angle Q2 between the monotone increasing part and the horizontal axis is (T2<Q2<45°), is extracted as the boundary point. In this way, even if the black pixel area and the white pixel area are located under special condition, the boundary point is extracted correctly.

Lastly, in order to extract a boundary line from the binary image, it is necessary to extract plural boundary points. In short, predetermined number of scan lines are set in the binary image and each boundary point is extracted from the predetermined number of scan lines respectively. Therefore, different scan line is set again in the binary image and the above processing is repeated for the different scan line till the boundary points are extracted from the predetermined number of scan lines (step 27).

In the above embodiment, all pixels on the scan line are examined in order and the cumulative value is calculated by adding "1" whenever black pixel is extracted. However, the pixels on the scan line may be examined at intervals of one pixel (in short, it is examined whether the pixel is black or not by unit of position of two pixels). In this case, the cumulative value is calculated by adding "2" whenever black pixel is extracted. In this way, on figure of graph of the cumulative histogram, the point between the flat part and the monotone increasing part at the angle of 45° with direction of the flat part is extracted as the boundary point. In short, in case that the pixels on the scan line are examined by unit of position of n pixels, the cumulative value is calculated by adding "n" whenever black pixel is extracted. In this case, in same way of the above embodiment, the boundary point between the flat part and the monotone increasing part at the angle of 45° with direction of the flat part is extracted from figure of graph of the cumulative histogram.

Figure 9:
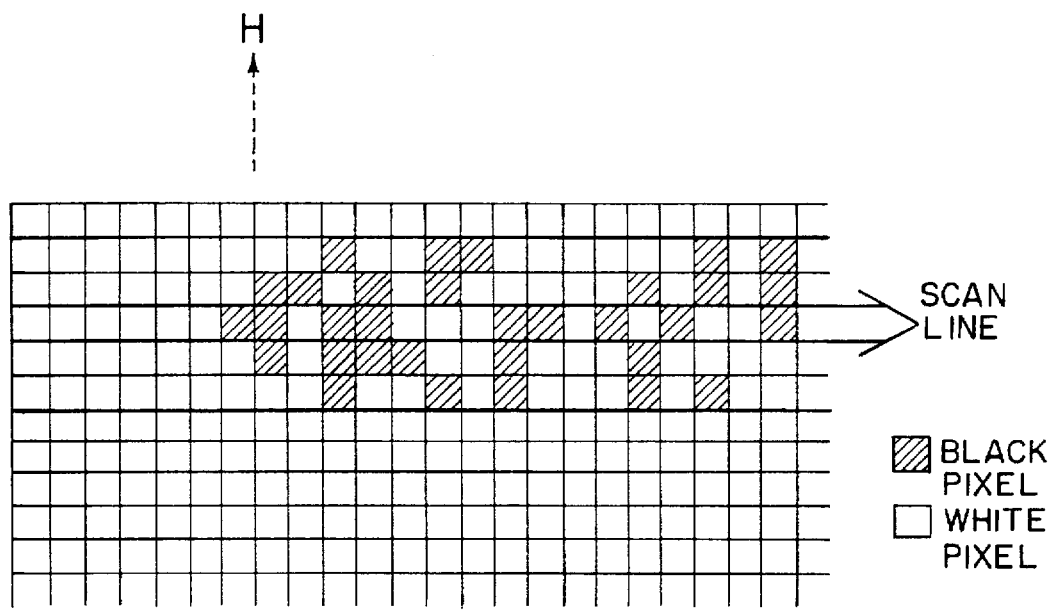
FIG. 9 is a schematic diagram of the scan line and neighboring lines on the binary image.
Figure 10:
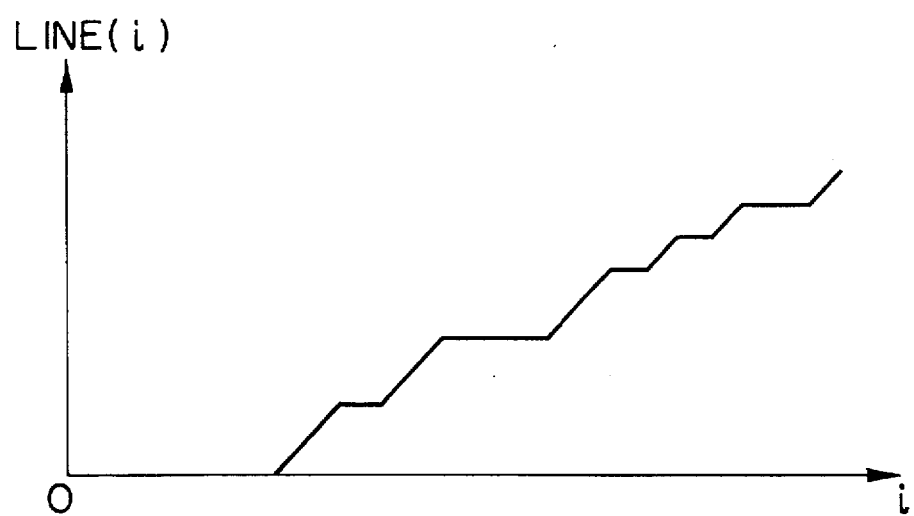
FIG. 10 is a schematic diagram of first example of the scan line of FIG. 9.
Figure 11:
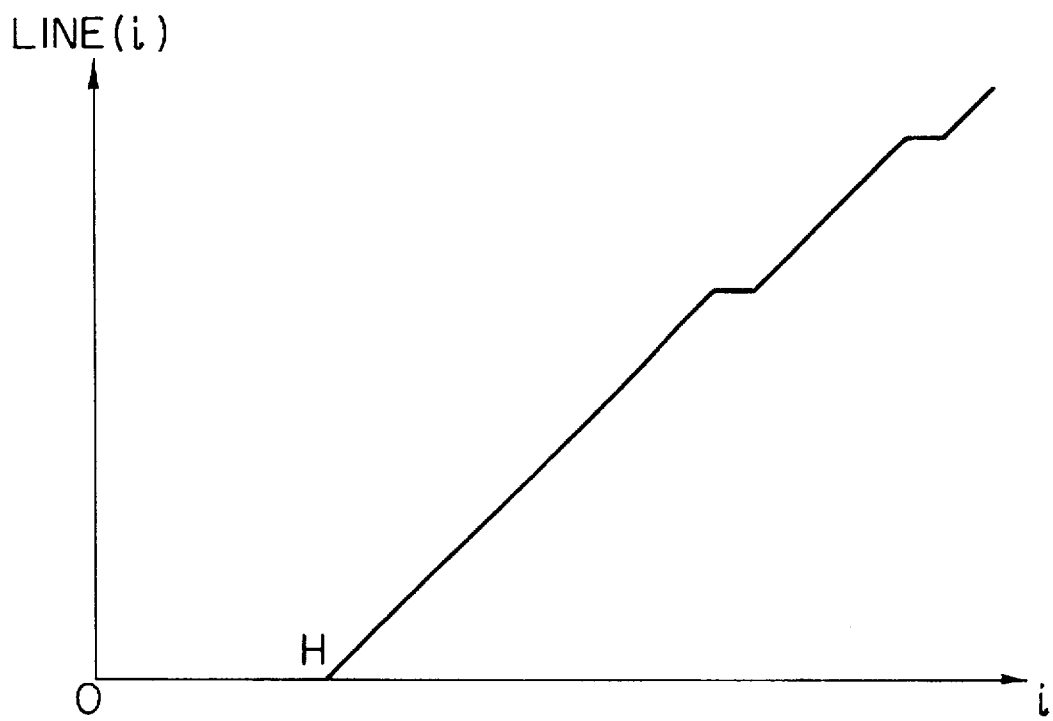
FIG. 11 is a schematic diagram of second example of the cumulative histogram corresponding to the scan line of FIG. 9.
Figure 12:
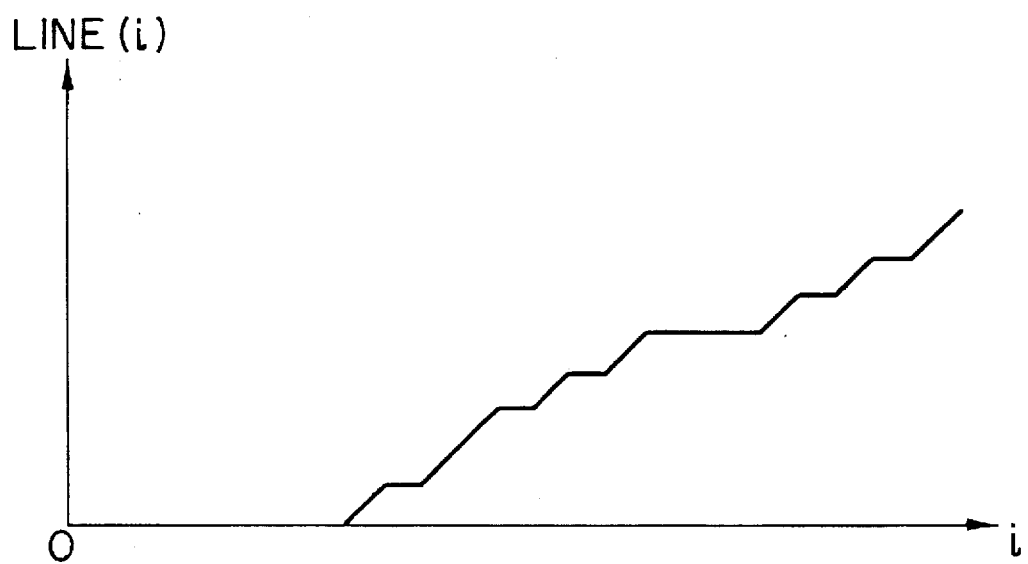
FIG. 12 is a schematic diagram of third example of the cumulative histogram corresponding to the scan line of FIG. 9.

In the above embodiment, the cumulative histogram is calculated from the pixels of the scan line. However, the cumulative histogram may be calculated from plural pixels of plural lines. In this case, the plural lines are comprised of the scan line as a center line and both side lines (upper line and lower line) of the scan line on the binary image. The plural pixels are comprised of notice pixel of the scan line and both side pixels of the both side lines, which the both side pixels are respectively located perpendicular to the notice pixel of the scan line. FIG. 9 shows an example of the scan line and the both side lines (upper two lines and lower two lines) on the binary image. If the cumulative value is calculated from the scan line (center line) only, the cumulative histogram is created shown in FIG. 10. However, if the cumulative value is calculated whenever at least one black pixel is extracted from the scan line and both side lines (upper two lines and lower two lines), the cumulative histogram is created shown in FIG. 11. If the cumulative value is calculated whenever number of black pixels is extracted to be larger than number of white pixels in five pixels of five lines (the scan line, the upper two lines and the lower two lines), the cumulative histogram is created shown in FIG. 12. In FIG. 11 compared with FIG. 10 and FIG. 12, point "H" is extracted as the boundary point because the flat part and the monotone increasing part satisfy the above condition. Therefore, the boundary point "H" is extracted from the plural line shown in FIG. 9.

In example of FIG. 9, two lines are set on upper side and lower side of the scan line respectively. However, plural lines (one line, three line, ...) may be set on upper side and lower side of the scan line respectively. In this case, even if the black pixel area includes many noise (scratchy, cut) on the binary image, the boundary point is extracted correctly without influence of the noise.

Figure 13:
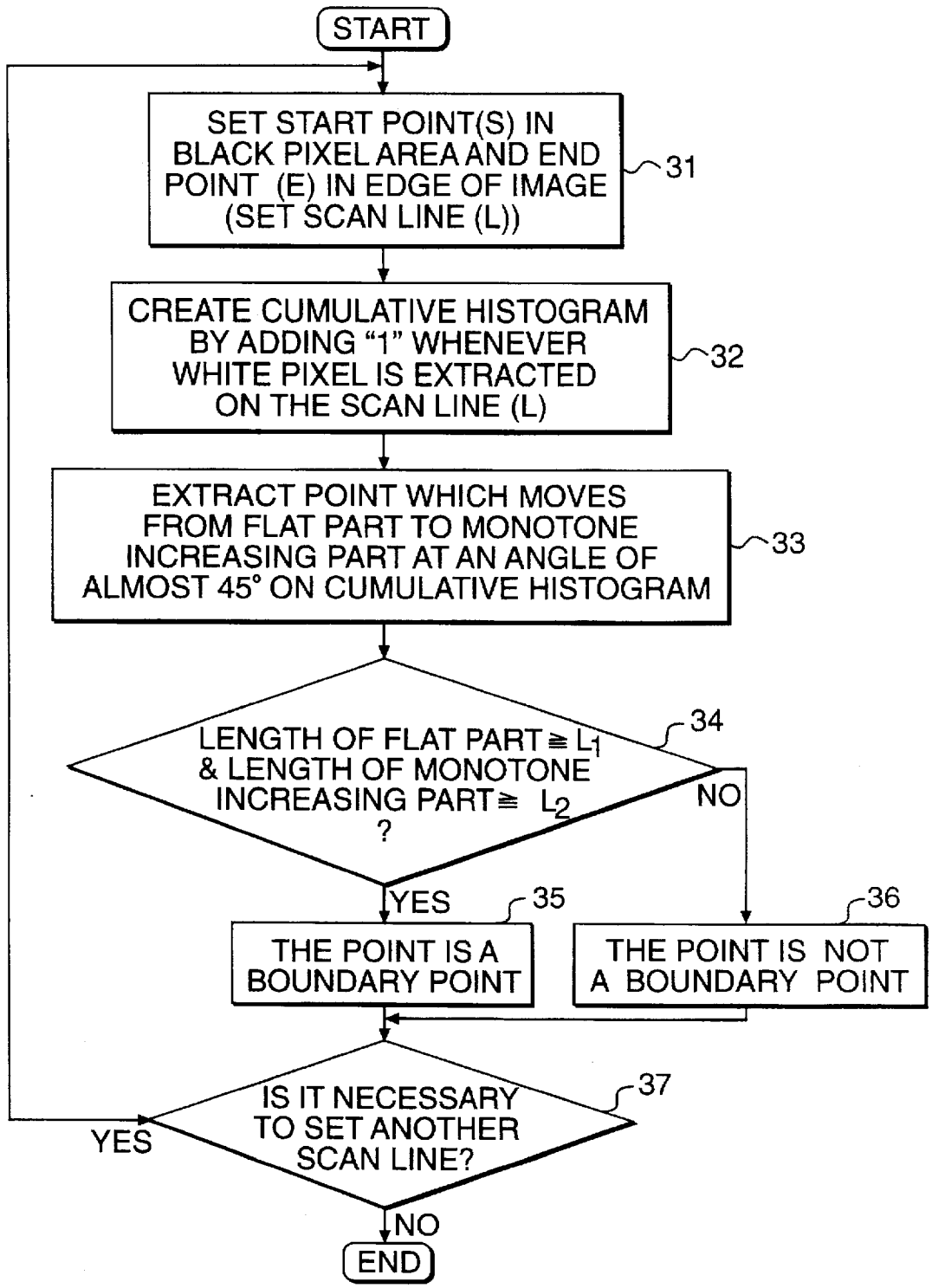
FIG. 13 is a flowchart of processing of the image processing apparatus according to another embodiment of the present invention.

In the above embodiment, the boundary point between white pixel area and black pixel area including many cut noises is extracted by setting the start point of the scan line in the white pixel area. However, in case the boundary point between black pixel area and white pixel area including many cut noises is extracted, the start point of the scan line is set in the black pixel area. In short, in the above embodiment, description of the white pixel and description of the black pixel are reversed. FIG. 13 is a flowchart of processing from steps of FIG. 13, steps different from steps of FIG. 2 are step 31 and step 32. In step 31, the start point "S" is set in black pixel area and the end point "T" is set at end side of the binary image. In short, in FIG. 6B and FIG. 6C, the scan lines are set reversing the black pixel area and the white pixel area. In step 32, the cumulative value is calculated by adding "1" whenever white pixel is extracted on the scan line. The other steps 33~33 are same as steps 23~27 of FIG. 2 respectively. In this way, the boundary point which moves from black pixel area to white pixel area on the binary image under the general situation is extracted correctly.

What is claimed is:

1. Image processing apparatus, comprising:

scan line set means for arbitrarily setting a scan line on a binary image;

cumulative histogram creation means for examining each pixel on the scan line of the binary image and for creating a cumulative histogram display having a first axis representing a pixel position in the scan line and a second axis perpendicular to the first axis representing a cumulative value;

means for adding a predetermined value to the cumulative value on the second axis whenever a black pixel is detected on the scan line, wherein a position of the cumulative value corresponds to the pixel position on the scan line of the first axis; and boundary point extraction means for extracting a pixel position on the scan line of the first axis corresponding to a point on a curve of the histogram, the histogram moving from a relatively flat part to a monotone increasing part at a predetermined angle with respect to a direction of the flat part and for detecting a point corresponding to the extracted pixel position from the binary image when a length of the relatively flat part is above a first threshold value and a length of the monotone increasing part is above a second threshold value, wherein the detected point is a boundary point which indicates a transition from the white pixel area to the black pixel area of the binary image.

2. Image processing apparatus according to claim 1,
wherein said cumulative histogram creation means includes means for creating a cumulative histogram having a horizontal axis which represents each pixel position of the scan line and a vertical axis which represents a cumulative value, one being added to the cumulative value whenever a black pixel is extracted;

and wherein said extracted point corresponds to a point on the histogram where the display moves from the relatively flat part to the monotone increasing part at an angle of about 45° with respect to the direction of the flat part.

3. Image processing apparatus according to claim 1,
wherein said cumulative histogram creation means examines pixels on the scan line of the binary image at intervals of a predetermined number, and creates the cumulative histogram having a horizontal axis which represents each pixel position of the scan line and a vertical axis which represents a cumulative value, the predetermined number being added to the cumulative value whenever black pixel is extracted;

and wherein said extracted point corresponds to a point on the histogram where the display moves from the relatively flat part to the monotone increasing part at an angle of about 45° with respect to the direction of the flat part.

4. Image processing apparatus according to claim 1,
wherein said cumulative histogram creation means creates the cumulative histogram, a predetermined value being added to the cumulative histogram whenever a black pixel is extracted at the same pixel position of plural lines including the scan line as a center line.

5. Image processing apparatus according to claim 1,
wherein said scan line set means sets plural scan lines, the plural scan lines being utilized to extract a boundary line by linking each boundary point extracted from the plural scan lines, between a white pixel area and a black pixel area on the binary image.

6. Image processing apparatus, comprising:
scan line set means for arbitrarily setting a scan line of a binary image;

cumulative histogram creation means for examining each pixel on the scan line of the binary image and for creating a cumulative histogram display having a first axis representing a pixel position in the scan line and a second axis perpendicular to the first axis representing a cumulative value;

means for adding a predetermined value to the cumulative value on the second axis whenever a white pixel is detected on the scan line, wherein a position of the cumulative value corresponds to the pixel position on the scan line of the first axis; and boundary point extraction means for extracting a pixel position on the scan line of the first axis corresponding to a point on a curve of the histogram, the histogram moving from a relatively flat part to a monotone increasing part at a predetermined angle with respect to a direction of the flat part and for detecting a point corresponding to the extracted pixel position from the binary image when a length of the relatively flat part is above a first threshold value and a length of the monotone increasing part is above a second threshold value, wherein the detected point is a boundary point which indicates a transition from the black pixel area to the white pixel area of the binary image.

7. Image processing apparatus according to claim 6,
wherein said cumulative histogram creation means includes means for creating a cumulative histogram having a horizontal axis which represents each pixel position of the scan line and a vertical axis which represents a cumulative value, one being added to the cumulative value whenever a white pixel is extracted;

and wherein said extracted point corresponds to a point on the histogram where the display moves from the flat part to the monotone increasing part at an angle of about 45° with respect to the direction of the flat part.

8. Image processing apparatus according to claim 6,
wherein said cumulative histogram creation means examines pixels on the scan line of the binary image at intervals of a predetermined number, and creates a cumulative histogram having a horizontal axis which represents each pixel position on the scan line and a vertical axis which represents a cumulative value, the predetermined number being added to the cumulative value whenever a white pixel is extracted, and wherein said boundary point corresponds to a point on the histogram where the display moves from the relatively flat part to the monotone increasing part at an angle of about 45° with respect to the direction of the flat part.

9. Image processing apparatus according to claim 6,
wherein said cumulative histogram creation means creates the cumulative histogram, a predetermined value being added to the cumulative histogram whenever a white pixel is extracted at the same pixel position of plural lines including the scan line as a center line.

10. Image processing apparatus according to claim 6,
wherein said scan line set means sets plural scan lines, the plural scan lines being utilized to extract a boundary line by linking each boundary point extracted from the plural scan lines, between a white pixel area and a black pixel area on the binary image.

11. Image processing method comprising the steps of:
setting a scan line on a binary image arbitrarily;

examining each pixel on the scan line of the binary image;

creating a cumulative histogram having a first axis representing a pixel position in the scan line and a second axis perpendicular to the first axis representing a cumulative value;

adding a predetermined value to the cumulative value on the second axis whenever a black pixel is detected on the scan line, where a position of the cumulative value corresponds to the pixel position on the scan line of the first axis;

extracting a pixel position on the scan line corresponding to a point on the curve of the histogram, the histogram moving from a relatively flat part to a monotone increasing part at a predetermined angle with respect to a direction of the flat part; and detecting a point corresponding to the extracted pixel position from the binary image when a length of the relatively flat part is above a first threshold value and a length of the monotone increasing part is above a second threshold value, wherein the detected point is a boundary point which indicates a transition from the white pixel area to the black pixel area of the binary image.

12. Image processing method comprising the steps of:
setting a scan line on a binary image arbitrarily;

examining each pixel on the scan line of the binary image;

creating a cumulative histogram having a first axis representing a pixel position in the scan line and a second axis perpendicular to the first axis representing a cumulative value;

adding a predetermined value to the cumulative value on the second axis whenever a white pixel is detected on the scan line, where a position of the cumulative value corresponds to the pixel position on the scan line of the first axis;

extracting a pixel position on the scan line corresponding to a point on the curve of the histogram, the histogram moving from a relatively flat part to a monotone increasing part at a predetermined angle with respect to a direction of the flat part; and detecting a point corresponding to the extracted pixel position from the binary image when a length of the relatively flat part is above a first threshold value and a length of the monotone increasing part is above a second threshold value, wherein the detected point is a boundary point which indicates a transition from the black pixel area to the white pixel area of the binary image.

* * * * *